Sept. 10, 1946.   C. E. MEYERHOEFER   2,407,570
MOTOR MOUNTING FOR RETRACTABLE LAMPS
Original Filed June 11, 1943
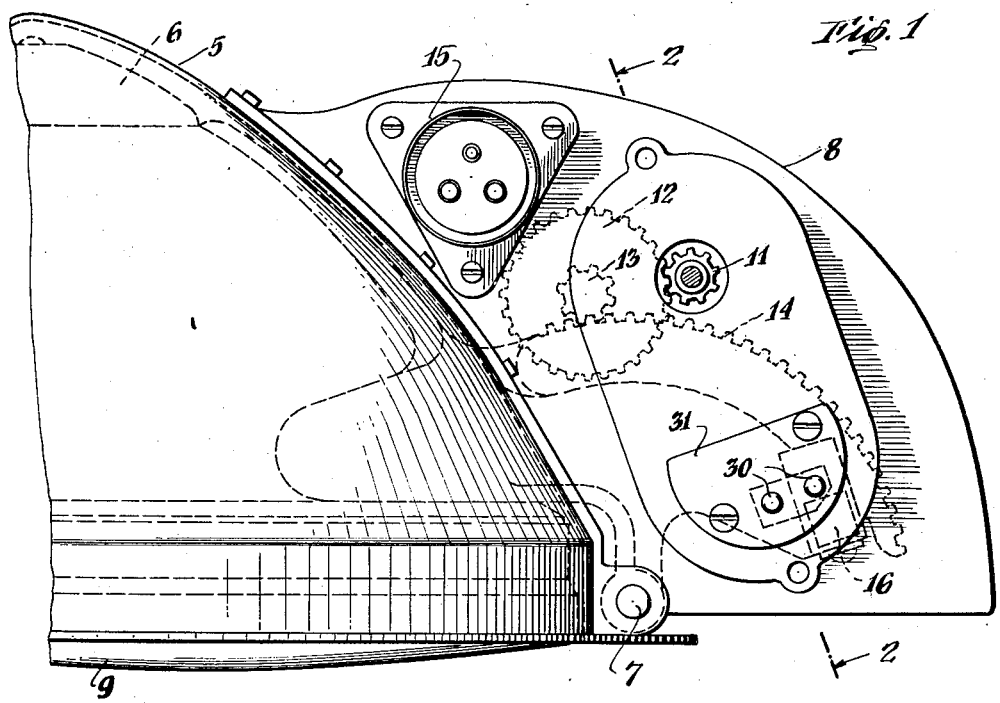
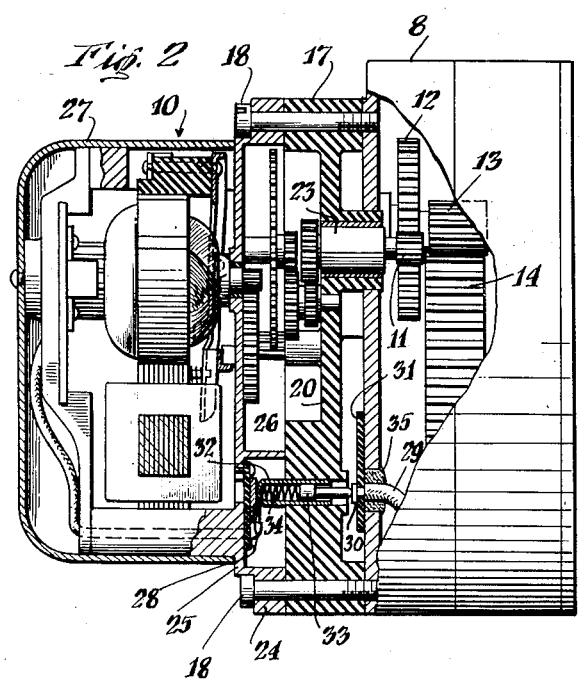
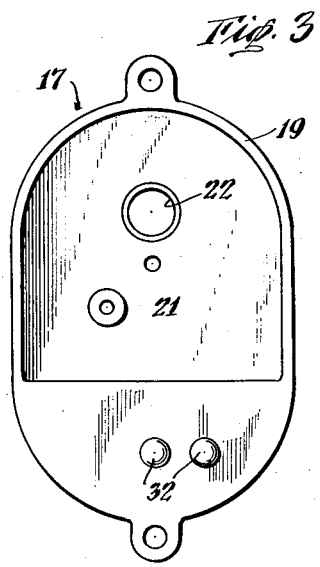
INVENTOR.
Carl E. Meyerhoefer
BY
ATTORNEYS Patented Sept. 10, 1946

2,407,570

UNITED STATES PATENT OFFICE 2,407,570

MOTOR MOUNTING FOR RETRACTABLE LAMPS

Carl E. Meyerhoefer, Brooklyn, N. Y., assignor to E. A. Laboratories, Inc., Brooklyn, N. Y., a corporation of New York Original application June 11, 1943, Serial No. 490,408. Divided and this application April 21, 1944, Serial No. 532,114

4 Claims. (Cl. 172—36)

1

This application is a division of my presently copending application Serial No. 490,408, filed June 11, 1943, entitled "Lamp."

This invention relates to an improved mounting for an electric motor, protecting the said motor against the ingress of water or dirt, and rendering the motor capable of substantially trouble-free use in exposed locations.

More particularly, the motor, when employed with the mounting means disclosed herein, is adapted for such exposed and inherently difficult installations as the operating motor for airplane landing lamps, wherein the lamp, when projected out of its housing prior to the landing of the aircraft, may scoop or deflect rain or snow, or water in the case of a seaplane, into the lamp housing and thence to the operating devices of the lamp, and particularly the motor casing thereof.

Such airplane landing lamps are conventionally projected from and retracted into their housings by means of an electric motor operating through reduction gears and a pivotally mounted rack secured to the lamp casing. It has been found impracticable to project the rack through a water-tight seal. Pursuant to the present invention, a water-proof and water-tight motor sub-base, serving additionally as a gear case, is interposed between the motor and the rack chamber of the lamp structure through which water is most likely to enter. The gear case, completely enclosed, may be packed with grease, which is of itself a water repellant, and additionally protects the motor against inflow of water.

An additional feature of the sub-base is the provision of improved electrical connector devices pursuant to which the electrical connections to the motor may be of a high order of electrical efficiency, while permitting speedy replacement of the motor without the necessity of breaking soldered connections, or soldering the same after motor replacement.

The replacement of a motor, by reason of the integral gear casing and mounting therefor, and the improved electrical connections, is greatly facilitated by the present invention.

With these and further objects in mind, reference is made to the attached sheet of drawings illustrating one practical embodiment of the invention, and in which:

Fig. 1 is a fragmentary motor-side view of a portion of a lamp housing and drive mechanism, the motor-unit having been removed;

Fig. 2 is a transverse sectional view of the encased motor and sub-base, taken along the lines 2—2 and in the direction of the arrows as indicated in Fig. 1; and Fig. 3 is a front elevation of the sub-base.

Referring to the drawing for a more detailed description, the reference numeral 5 indicates a housing within which a shell 6 is retractable. The latter is pivotally supported as at 7 with respect to the casing 8. The shell 6 contains a light unit of which the lens 9 has been indicated in Fig. 1.

As also indicated in this figure, a suitably encased motor unit 10 is mounted upon the casing 8 and serves to drive a sprocket or pinion 11 which, through gears 12 and 13, drives an arcuate rack 14 which serves to project and retract the shell 6. A socket 15 provides for electrical connection with a main power source, and a brush and switch structure generally indicated at 16 is in circuit with a filament of the lamp.

Pursuant to the present invention, the encased motor is mounted upon a sub-base 17, see Fig. 2, preferably formed of dielectric material and interposed between the motor and the casing portion 8. As will be appreciated from an inspection of this view, certain details of the gear assembly and the reduction drive have been somewhat schematically illustrated in Fig. 1; this being for the purpose of simplifying the illustration. To thus secure the encased motor to the casing 8 with the sub-base 17 interposed between the same, bolts 18 have been conveniently employed. These bolts obviously serve as a medium permitting of ready dismounting of the parts and a coupling of the same such that the relative movements between the several portions are normally precluded.

The sub-base 17, shown in half-section in Fig. 2, is characterized by a continuous peripheral wall 19 and an intermediate web 20 which forms the base of a recess 21 and is configurated to receive a bearing 22 for the shaft 23 of pinion 11.

Wall 19 is in tight engagement with a complementary peripheral wall 24 projecting downwardly from the motor-frame base 25; and a recess 26 bounded by wall 24 cooperates with the recess 21 of sub-base 17 to form a gear casing within which the gear train between motor and pinion 11 may be housed.

It will be appreciated that as a consequence of employing the sub-base 17, it is feasible to pack the gearing contained therein in a lubricant, thereby providing a water-tight seal. It will be almost impossible for water to enter into the motor via the gear train under any circumstances. Obviously, this feature is of value when the present structure is employed in connection with any vehicle or mounting which is exposed to the action of the elements. It is of especial value in the case of airplanes, and particularly seaplanes. As will be understood, in both such installations the lamps are almost invariably projected during a night landing and thus water (in the case of seaplanes, in the form of salt spray) is free to impinge upon the lamp, its shell and within the housing. Generally, it is not feasible to provide a water-tight fit which will prevent moisture from moving along the arcuate rack 14 and into engagement with the pinion 11.

In aircraft landing lamp installations, the casing 8 is usually housed within a wing; the sub-base 17 serves to position the motor sufficiently remote from any wing opening to protect the motor from direct impingement of water or spray against the motor casing 27. Such water or spray as may strike the sub-base 17 cannot seep into the gear casing because of the snug fit between the motor-frame wall 24 and the wall 19, and additionally because of the lubricant packing within said gear casing, when employed.

Also pursuant to the teachings of the present invention, contacts 28 may be insulatedly mounted on the motor base 25 and connected by leads to energize the motor when these contacts are in electrical connection with a source of current supply. Such a source is furnished from the socket 15 through leads 29 to contacts 30. The latter are carried by an insulating plate 31 mounted on the exterior face of the casing 8. The insulating plate 31 serves to seal the opening through which the conductors 29 pass. Disposed within a thickened portion of web 20 are conductor elements comprising shells 32 and plungers 33 in tight sliable engagement therewith; a spring 34 is provided in each such conductor element to normally project the plunger 33.

Obviously, said conductor elements are associated with the sub-base 17 in line with the contacts 28 and 30 when casing 8, encased motor 10, and the exposed base 17 are properly disposed with respect to each other. It follows that a mechanic will have no difficulty in simply applying the sub-base 17 to the casing 8 and thereupon mounting the cased motor 10 upon the base 17. As afore brought out, the position of the several parts is preferably maintained by the bolts 18. As the parts are tightened, it is apparent that the plungers 33 will engage the respective contacts 30 while the shells 32 will engage corresponding contacts 28. Thus, as the motor is mounted in position, the electrical connection will be automatically established by the mechanic and without any conscious effort on his part. Accordingly, there will be no problem of breaking this connection as the parts are dismounted, or re-soldering or otherwise re-establishing the same upon the parts being assembled.

It is apparent that insulation plate 31 prevents entry of moisture into the sub-base 17. In normal operation and servicing it is almost never necessary to break the connections at 29, 30 because of the conductor elements 32, 33, and the area of connection of leads 29 and contacts 30 may be permanently sealed with mastic insulation 35.

From the foregoing, it will be understood that among others the several objects of the invention are achieved. Obviously, numerous changes in construction and rearrangements of the parts might be resorted to without departing from the spirit of the invention as defined by the claims.

I claim:

1. A structure of the class described including in combination a motor casing having a side wall and a flange peripherally extending therefrom, a further casing adapted to contain a mechanism to be driven by the motor within said first named casing said further casing having a flat side wall portion, and a unitary removable sub-base interposed between and in fluid tight engagement with the peripheral wall and side wall of said respective casings, said sub-base being adapted to contain a moisture-repellent substance to prevent entrance of water into said motor casing.

2. In an electric motor unit having geared drive means, a motor frame base having a continuous peripheral wall defining a recess, a unitary removable sub-base having a complementary peripheral wall and an integral web in substantial parallelism with said motor base, the peripheral walls of said motor base and said sub-base being in fluid tight engagement and jointly defining a completely enclosed gear case for said motor; connection means disposed within and passing through the integral web of said sub-base, and contact means on said motor base in yieldable separable engagement with said conductor means.

3. In a fluid-tight motor housing, a motor frame base having an imperforate peripheral wall defining a recess, a unitary removable sub-base having a peripheral wall and an internal web, gear train means carried by said removable sub-base, said sub-base being in fluid-tight edge-to-edge engagement with said motor base wall and forming therewith, a fluid-tight gear case for said motor, connection means disposed within the web of said sub-base and passing therethrough, said connection means including spring contact means on each face of said web, and contact plates on said motor base yieldably engaging with said spring contacts to provide means for electrically connecting said motor from a point externally of said sub-base.

4. In combination, an electric motor having a base defined by a forwardly extending peripheral wall, a device to be driven by said motor through a gear train, said device having a side wall, electricity conductors within said device adapted to be connected to a power source and terminating in contact means provided on the outer face of said side wall; electricity conductors for said motor terminating in contact means at the base thereof and within the boundaries of said peripherall wall; a unitary removable sub-base having a gear train mounted therein to provide mechanical connection between said motor and said driven device, said sub-base having a peripheral wall engageable with the peripheral wall of said motor base and with the side wall of said device to provide a substantially fluid tight chamber, and also having a web integral with its said peripheral wall; and spring biased conductor elements secured within and extending through said web for removably engaging the respective contact terminals on said side wall and on said motor base to complete the electrical circuit from said driven device to said motor.

CARL E. MEYERHOEFER.